(12) United States Patent
Yamada

(10) Patent No.: US 12,305,112 B2
(45) Date of Patent: May 20, 2025

(54) THERMALLY-CONDUCTIVE SILICONE COMPOSITION

(71) Applicant: SHIN-ETSU CHEMICAL CO., LTD., Tokyo (JP)

(72) Inventor: Kunihiro Yamada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 874 days.

(21) Appl. No.: 17/420,199

(22) PCT Filed: Dec. 23, 2019

(86) PCT No.: PCT/JP2019/050241
§ 371 (c)(1),
(2) Date: Jul. 1, 2021

(87) PCT Pub. No.: WO2020/145102
PCT Pub. Date: Jul. 16, 2020

(65) Prior Publication Data
US 2022/0145156 A1 May 12, 2022

(30) Foreign Application Priority Data
Jan. 10, 2019 (JP) .................. 2019-002591

(51) Int. Cl.
| | | |
|---|---|---|
| *C09K 5/14* | (2006.01) | |
| *C08G 77/20* | (2006.01) | |
| *C08K 3/08* | (2006.01) | |
| *C08K 3/22* | (2006.01) | |
| *C08K 3/38* | (2006.01) | |

(52) U.S. Cl.
CPC ............. *C09K 5/14* (2013.01); *C08G 77/20* (2013.01); *C08K 3/08* (2013.01); *C08K 3/22* (2013.01); *C08K 3/38* (2013.01); *C08K 2003/0812* (2013.01); *C08K 2003/2227* (2013.01); *C08K 2003/2296* (2013.01); *C08K 2003/385* (2013.01); *C08K 2201/001* (2013.01); *C08K 2201/005* (2013.01); *C08K 2201/011* (2013.01); *C08K 2201/014* (2013.01)

(58) Field of Classification Search
CPC . C09K 5/14; C08G 77/20; C08K 3/08; C08K 3/22; C08K 3/38; C08K 2003/0812; C08K 2003/2227; C08K 2003/2296; C08K 2003/385; C08K 2201/001; C08K 2201/005; C08K 2201/011; C08K 2201/014
See application file for complete search history.

(56) References Cited

U.S. PATENT DOCUMENTS

| | | |
|---|---|---|
| 6,255,257 B1 | 7/2001 | Yamada et al. |
| 9,428,680 B2 | 8/2016 | Zambova |
| 2002/0018885 A1 | 2/2002 | Takahashi et al. |
| 2003/0195124 A1 | 10/2003 | Yamada et al. |
| 2008/0269084 A1 | 10/2008 | Matsumoto et al. |
| 2010/0130673 A1 | 5/2010 | Ito et al. |
| 2012/0119137 A1* | 5/2012 | Tsuji .................. C09K 5/14 252/78.3 |
| 2015/0001439 A1* | 1/2015 | Tsuji .................. C10M 169/02 252/75 |
| 2018/0291249 A1 | 10/2018 | Yamada |

FOREIGN PATENT DOCUMENTS

| | | |
|---|---|---|
| EP | 0 896 031 A2 | 2/1999 |
| JP | 11-49958 A | 2/1999 |
| JP | 11-246884 A | 9/1999 |
| JP | 2000-63873 A | 2/2000 |
| JP | 2000-169873 A | 6/2000 |
| JP | 2006-169343 A | 6/2008 |
| JP | 4130091 B2 | 8/2008 |
| JP | 2008-274036 A | 11/2008 |

(Continued)

OTHER PUBLICATIONS

Extended European Search Report for European Application No. 19908643.0 dated Sep. 9, 2022.
International Search Report (PCT/ISA/210) issued in PCT/JP2019/050241, dated Mar. 24, 2020.
Written Opinion of the International Searching Authority (PCT/ISA/237) issued in PCT/JP2019/050241, dated Mar. 24, 2020.

*Primary Examiner* — Jane L Stanley

(74) *Attorney, Agent, or Firm* — Birch, Stewart, Kolasch & Birch, LLP

(57) ABSTRACT

This thermally-conductive silicone composition contains specific proportions of (A) an organopolysiloxane having a thixotropic index α of 1.51-2.00, and a viscosity of 10-1,000,000 mPa·s as measured at 25° C. using a B-type rotational viscometer at a rotor rotational speed of 2 rpm (provided that the thixotropic index α is a value calculated by α=η1/η2, where η1 and η2 respectively represent viscosities at rotor rotational speeds of 2 rpm and 4 rpm, as measured at 25° C. using a B-type rotational viscometer), (B) a thermally-conductive inorganic filler having a Mohs hardness not more than 5 and an average particle size of 0.1-200 μm, and (C) a volatile solvent in which the components (A) and (B) can be dispersed or dissolved, wherein the thermally-conductive silicone composition does not contain a thermally-conductive inorganic filler having a Mohs hardness of more than 5. This thermally-conductive silicone composition does not cause damage to a silicon chip, and has excellent workability and displacement resistance.

8 Claims, No Drawings

(56) References Cited

FOREIGN PATENT DOCUMENTS

| | | | | |
|---|---|---|---|---|
| JP | 2010-13563 | A | 1/2010 | |
| JP | 2011-246536 | A | 12/2011 | |
| JP | 5283553 | B2 | 9/2013 | |
| JP | 5388329 | B2 | 1/2014 | |
| JP | 2017-2179 | A | 1/2017 | |
| KR | 20120051585 | A * | 5/2012 | ............. C08L 83/04 |
| WO | WO-2017051738 | A1 * | 3/2017 | ............. C08G 77/20 |
| WO | WO 2017/064976 | A1 | 4/2017 | |

\* cited by examiner

THERMALLY-CONDUCTIVE SILICONE COMPOSITION

TECHNICAL FIELD

The present invention relates to a thermally conductive silicone composition, and more particularly to a thermally conductive silicone composition that does not damage silicon chips and has an excellent resistance to creep.

BACKGROUND ART

Electrical and electronic components generate heat during use, and so heat removal is generally necessary in order to allow these components to operate properly. Various types of thermally conductive materials used for such heat removal have hitherto been described. Thermally conductive materials for this purpose exist in two forms: (1) sheet-like materials that are easy to handle, and (2) paste-like materials called thermal greases.

Of these, sheet-like materials (1) are easy to handle and also have an excellent stability. On the other hand, because the contact thermal resistance inevitably increases, the thermal interface performance is inferior to that of thermal greases. Moreover, such materials are required to have a certain degree of strength and rigidity in order to maintain the form of a sheet and so are unable to absorb the tolerances that arise between a component and its housing; as a result, the component is sometimes destroyed by stress from these materials.

By contrast, in the case of thermal greases (2), not only can these be adapted to the mass production of electrical and electronic components through the use of applicators and the like, with their low contact thermal resistance, they also provide the advantage of having an excellent thermal interface performance. However, when the viscosity of a thermal grease is lowered for large-volume use in screen printing and the like, "creeping" of the grease (the pump-out phenomenon) occurs due to, for example, thermal impacts on the components. Hence, heat removal becomes inadequate, as a result of which component malfunction sometimes arises.

This situation has led to the disclosure of thermally conductive silicone grease compositions of even higher performance, such as a grease-type silicone composition that combines a specific organopolysiloxane, a thickener such as zinc oxide, alumina, aluminum nitride, boron nitride or silicon carbide, an organopolysiloxane having at least one silicon-bonded hydroxyl group per molecule and an alkoxysilane, and suppresses bleeding of the base oil (Patent Document 1: JP-A H11-49958); a thermally conductive silicone composition of excellent thermal conductivity and dispensability which is obtained by combining a liquid silicone with a thermally conductive inorganic filler having a given thermal conductivity and a Mohs hardness of 6 or more and a thermally conductive inorganic filler having a given thermal conductivity and a Mohs hardness of 5 or less (Patent Document 2: JP-A H11-246884); a thermally conductive grease composition obtained by combining a specific base oil with a metallic aluminum powder having an average particle size of from 0.5 to 50 μm (Patent Document 3: JP-A 2000-63873); a silicone grease composition wherein the loading of aluminum nitride in the silicone grease has been increased by using in admixture two types of aluminum nitride powders of differing average particle sizes (Patent Document 4: JP-A 2000-169873); and silicone grease compositions that suppress bleed out by increasing the oil viscosity (Patent Documents 5 to 8: JP No. 4130091, JP No. 5388329, JP No. 5283553, JP-A 2010-013563).

However, devices such as tablets and smart phones have been getting thinner in recent years, and the trend is toward thinner dimensions even in the silicon chips used in central processing units (CPUs) and general processing units (GPUs). As silicon chips become thinner, warpage arises more easily than in the past, an effect of which is that thermally conductive silicone grease applied onto silicon chips have a greater tendency to creep. Also, because the silicon chips are thin, owing to the influence of the filler in the thermally conductive silicon grease, damage and even cracking sometimes arises.

PRIOR ART DOCUMENTS

Patent Documents

Patent Document 1: JP-A H11-49958
Patent Document 2: JP-A H11-246884
Patent Document 3: JP-A 2000-63873
Patent Document 4: JP-A 2000-169873
Patent Document 5: JP No. 4130091
Patent Document 6: JP No. 5388329
Patent Document 7: JP No. 5283553
Patent Document 8: JP-A 2010-013563

SUMMARY OF INVENTION

Technical Problem

This invention was arrived at in light of the above circumstances. The object of the invention is to provide a thermally conductive silicone composition which does not damage silicon chips and which is very easy to work with and has an excellent resistance to creep.

Solution to Problem

The inventor, as a result of conducting extensive investigations in order to achieve the above object, has found that a thermally conductive silicone composition which uses only a thermally conductive inorganic filler having a specific Mohs hardness together with a specific organopolysiloxane and which is diluted with a solvent does not damage silicon chips and enables a good workability and a good creep resistance to be obtained. This discovery ultimately led to the present invention.

Accordingly, the invention provides the following thermally conductive silicone composition.

[1]

A thermally conductive silicone composition which includes:
(A) 100 parts by weight of an organopolysiloxane having a thixotropic index α of from 1.51 to 2.00 (the thixotropic index α being the value calculated from the formula $\alpha=\eta 1/\eta 2$, where $\eta 1$ is the viscosity measured at 25° C. using a Brookfield rotational viscometer at a rotor speed of 2 rpm and $\eta 2$ is the viscosity similarly measured at a rotor speed of 4 rpm) and a viscosity, as measured at 25° C. using a Brookfield rotational viscometer at a rotor speed of 2 rpm, of from 10 to 1,000,000 mPa,
(B) from 100 to 3,000 parts by weight of a thermally conductive inorganic filler having a Mohs hardness of 5 or less and an average particle size of from 0.1 to 200 μm, and (C) from 0.1 to 100 parts by weight of a volatile solvent in which components (A) and (B) can be dispersed or dissolved, wherein the composition is free of thermally conductive inorganic filler having a Mohs hardness greater than 5.

[2]

The thermally conductive silicone composition of [1], wherein the organopolysiloxane (A) includes from 1 to 95 wt % of (a1) a hydrolyzable organopolysiloxane of general formula (1) below that is trifunctional at one end

[Chem. 1]

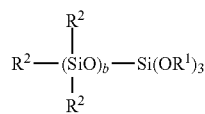
(1)

(wherein each $R^1$ is independently an alkyl group of 1 to 6 carbon atoms, each $R^2$ is independently a saturated or unsaturated monovalent hydrocarbon group of 1 to 20 carbon atoms, and b is an integer from 5 to 120).

[3]

The thermally conductive silicone composition of [2], wherein the organopolysiloxane of component (A) other than (a1) the hydrolyzable organopolysiloxane of general formula (1) that is trifunctional at one end is (a2) an addition reaction product of an organopolysiloxane having at least one alkenyl group per molecule with an organohydrogenpolysiloxane of general formula (2) below

[Chem. 2]

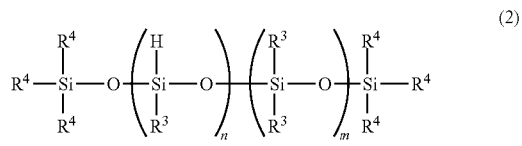
(2)

(wherein each $R^3$ is independently a saturated or unsaturated monovalent hydrocarbon group of 1 to 20 carbon atoms, each $R^4$ is independently a hydrogen atom or $R^3$, n is an integer from 1 to 1,000, and m is an integer from 0 to 1,000).

[4]

The thermally conductive silicone composition of any of [1] to [3], wherein the thermally conductive inorganic filler of component (B) is at least one selected from the group consisting of aluminum powder, zinc oxide powder, boron nitride powder and aluminum hydroxide powder.

[5]

The thermally conductive silicone composition of any of [1] to [4], wherein the solvent of component (C) is an isoparaffinic solvent having a boiling point between 80° C. and 360° C.

Advantageous Effects of Invention

The thermally conductive silicone composition of the invention, because it not only has an excellent thermal conductivity but also does not damage silicon chips and moreover is easy to work with and has a good creep resistance, is well-suited for removing heat from electrical and electronic components that generate heat during use.

DESCRIPTION OF EMBODIMENTS

[Component (A)]

The organopolysiloxane serving as component (A) in the thermally conductive silicone composition of the invention is a liquid silicone that has a thixotropic index α, defined as η1/η2, which is from 1.51 to 2.00, and has a viscosity, as measured at 25° C. with a Brookfield rotational viscometer at a rotor speed of 2 rpm, of from 10 to 1,000,000 mPa·s.

Here, η1 is the viscosity when measured at 25° C. with a Brookfield rotational viscometer at a rotor speed of 2 rpm, and η2 is the viscosity when measured at 25° C. with a Brookfield rotational viscometer at a rotor speed of 4 rpm.

As mentioned above, the thixotropic properties of component (A) are expressed as the thixotropic index α; the larger this thixotropic index α, the higher the oil viscosity. In the practice of the invention, it is critical for the thixotropic index α of the organopolysiloxane serving as component (A) to be from 1.51 to 2.00, and preferable for this to be from 1.60 to 1.90. At a thixotropic index α smaller than 1.51, the creep resistance is inadequate; at a thixotropic index α larger than 2.00, dispersion in a solvent is difficult and the workability is poor.

In this invention, the viscosity of the organopolysiloxane of component (A), as measured at 25° C. using a Brookfield rotational viscometer at a rotor speed of 2 rpm, must be in the range of from 10 to 1,000,000 mPa·s, and is preferably from 100 to 100,000 mPa·s. When the viscosity at 25° C. is lower than 10 mPa·s, the resulting thermally conductive silicone composition has a poor stability; when it is higher than 1,000,000 mPa·s, mixture with component (B) is difficult.

The organopolysiloxane of component (A) preferably includes from 1 to 95 wt % of (a1) a hydrolyzable organopolysiloxane of general formula (1) below that is trifunctional at one end

[Chem. 3]

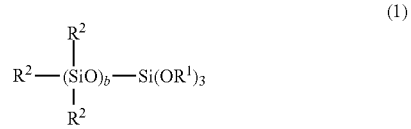
(1)

(wherein each $R^1$ is independently an alkyl group of 1 to 6 carbon atoms, each $R^2$ is independently a saturated or unsaturated monovalent hydrocarbon group of 1 to 20 carbon atoms, and b is an integer from 5 to 120).

$R^1$ in general formula (1) is an alkyl group of 1 to 6 carbon atoms, such as a methyl, ethyl or propyl group, and is preferably a methyl group.

$R^2$ is a moiety selected from the group consisting of saturated or unsaturated monovalent hydrocarbon groups of 1 to 20 carbon atoms. Specific examples include alkyl groups such as methyl, ethyl, propyl, hexyl, octyl, decyl, dodecyl, tetradecyl, hexadecyl and octadecyl groups; cycloalkyl groups such as cyclopentyl, cyclohexyl groups; alkenyl groups such as vinyl and allyl groups; aryl groups such as phenyl and tolyl groups; aralkyl groups such as 2-phenylethyl and 2-methyl-2-phenylethyl groups; and halogen-substituted monovalent hydrocarbon groups such as 3,3,3-trifluoropropyl, 2-(perfluorobutyl)ethyl, 2-(perfluorooctyl)ethyl and p-chlorophenyl groups. $R^2$ is preferably a methyl group.

$R^1$ and $R^2$ may each be the same or different.

Also, b is an integer from 5 to 120, and preferably an integer from 10 to 100. When b is too small, the viscosity may become too low and oil bleed from the resulting composition may increase; when b is too large, the viscosity may become high, as a result of which the viscosity of the composition may become too high, making the composition difficult to handle.

In the organopolysiloxane serving as component (A), the organopolysiloxane other than (a1) the hydrolyzable organopolysiloxane of general formula (1) that is trifunctional at one end, although not particularly limited, is preferably (a2) an addition reaction product (organopolysiloxane) obtained by addition-reacting an organopolysiloxane having at least one alkenyl group per molecule with an organohydrogenpolysiloxane of general formula (2) below having at least one SiH group in the presence of a platinum-based catalyst such as uncombined platinum, chloroplatinic acid, a platinum-olefin complex or a platinum-alcohol complex.

The alkenyl group-containing organopolysiloxane is an organopolysiloxane having at least one, and preferably from two to five, alkenyl groups bonded directly to silicon atoms.

The molecular structure of the alkenyl group-containing organopolysiloxane is not particularly limited, and may be linear or branched. However, it is preferably a linear diorganopolysiloxane in which the backbone is basically made up of repeating diorganosiloxane units and which is capped at both ends of the molecular chain with triorganosiloxy groups. The alkenyl group-containing organopolysiloxane may be of one type used alone or two or more types may be used in admixture.

Examples of the alkenyl groups include vinyl, allyl, 1-butenyl and 1-hexenyl groups. From the standpoint of the ease of synthesis and cost, vinyl groups are preferred.

The silicone-bonded alkenyl groups may be located at the ends or partway along the molecular chain of the organopolysiloxane. From the standpoint of flexibility, it is preferable for the alkenyl groups to be located only at both ends, although some of the organopolysiloxane may have alkenyl groups located only at one end.

Examples of other organic groups that bond to silicon atoms include the following monovalent hydrocarbon groups: alkyl groups such as methyl, ethyl, propyl, butyl, hexyl and dodecyl groups, aryl groups such as the phenyl group, and aralkyl groups such as 2-phenylethyl and 2-phenylpropyl groups; and also halogen-substituted monovalent hydrocarbon groups such as chloromethyl and 3,3,3-trifluoropropyl groups. Of these, from the standpoint of the ease of synthesis and cost, it is preferable for at least 90 mol % of the organic groups to be methyl groups.

The alkenyl group-containing organopolysiloxane has a viscosity at 25° C., as measured using an Ostwald viscometer, of preferably from 10 to 100,000 mm²/s, and more preferably from 100 to 30,000 mm²/s. A mixture of two or more alkenyl group-containing organopolysiloxanes of differing viscosities may be used.

The organohydrogenpolysiloxane having at least one, preferably from 2 to 100, and more preferably from 2 to 50, Si—H groups is represented by general formula (2) below

[Chem. 4]

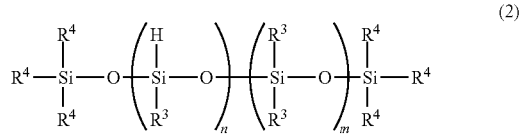

(2)

(wherein each $R^3$ is independently a saturated or unsaturated monovalent hydrocarbon group of 1 to 20 carbon atoms, each $R^4$ is independently a hydrogen atom or $R^3$, n is an integer from 1 to 1,000, and m is an integer from 0 to 1,000).

$R^3$ in above general formula (2) is at least one group selected from the group consisting of saturated or unsaturated monovalent hydrocarbon groups of 1 to 20 carbon atoms. Specific examples include alkyl groups such as methyl, ethyl, propyl, hexyl, octyl, decyl, dodecyl, tetradecyl, hexadecyl and octadecyl groups; cycloalkyl groups such as cyclopentyl and cyclohexyl groups; alkenyl groups such as vinyl and allyl groups; aryl groups such as phenyl and tolyl groups; aralkyl groups such as 2-phenylethyl and 2-methyl-2-phenylethyl groups; and halogen-substituted monovalent hydrocarbon groups such as 3,3,3-trifluoropropyl, 2-(perfluorobutyl)ethyl, 2-(perfluorooctyl)ethyl and p-chlorophenyl groups. From the standpoint of the ease of synthesis and cost, it is preferable for at least 90 mol % of $R^3$ to be methyl groups.

$R^4$ is a hydrogen atom or $R^3$, and is preferably a methyl group.

Also, n and m respectively satisfy the conditions $1 \leq n \leq 1{,}000$ and $0 \leq m \leq 1{,}000$, preferably $2 \leq n \leq 100$ and $1 \leq m \leq 200$, and more preferably $2 \leq n \leq 50$ and $0 \leq m \leq 100$. When n is too high, the viscosity may become too high, making the composition difficult to handle. Similarly, when m is too high, the viscosity may become too high, making the composition difficult to handle.

The organohydrogenpolysiloxane having at least one SiH group may be of one type used alone or two or more may be used in admixture.

The SiH group-containing organohydrogenpolysiloxane is used in an amount such that the ratio expressed as (number of SiH groups on SiH group-containing organohydrogenpolysiloxane)/(number of alkenyl groups on alkenyl group-containing organopolysiloxane) is preferably from 0.3 to 3.0, and more preferably from 0.4 to 1.5. When this value is too small, the composition may not have the desired thixotropic index; when it is too large, the composition may lack flowability and be difficult to handle.

The platinum-based catalyst is used in an amount which is not particularly limited. The amount of platinum-based catalyst, expressed in terms of the weight of the platinum group metal relative to the combined weight of the alkenyl group-containing organopolysiloxane and the organohydrogenpolysiloxane having at least one SiH group, is preferably from 1 to 200 ppm, and more preferably from 5 to 100 ppm.

The addition reaction between the alkenyl group-containing organopolysiloxane and the organohydrogenpolysiloxane having at least one SiH group may be carried out in the usual manner. The reaction conditions are preferably a temperature between 100° C. and 180° C., especially between 120° C. and 160° C., and a time of from 0.5 to 5 hours, especially from 1 to 3 hours.

The alkenyl group-containing organopolysiloxane and the organohydrogenpolysiloxane having at least one SiH group may also be addition-reacted in a state in which other organopolysiloxanes, such as above component (a1), are admixed.

The content of the hydrolyzable organopolysiloxane of general formula (1) that is trifunctional at one end in the organopolysiloxane serving as component (A) is preferably from 1 to 95 wt %, more preferably from 20 to 90 wt %, and even more preferably from 30 to 80 wt %. At a content lower than 1 wt %, the compatibility between component (B) and component (A) worsens; at more than 95 wt %, the creep resistance worsens.

In addition, a component (a3) other than components (a1) and (a2), such as a dimethylpolysiloxane without reactive groups, may be mixed into the organopolysiloxane of component (A) in a range of from 10 to 50 wt %.

In the organopolysiloxane serving as component (A), the thixotropic index α defined as η1/η2 can be set to from 1.51 to 2.00 by, for example, adjusting the amount of component (a1) used or by, when preparing component (a2), adjusting the amount of organohydrogenpolysiloxane.

[Component (B)]

Component (B) in the thermally conductive silicone composition of the invention is a thermally conductive inorganic filler having a Mohs hardness of 5 or less and an average particle size of from 0.1 to 200 μm. This inorganic filler imparts thermal conductivity to the thermally conductive silicone composition of the invention. In the present invention, setting the Mohs hardness and the average particle size in specific ranges has the advantageous effect of preventing silicon chip damage. The Mohs hardness used herein, sometimes referred to as the "original" Mohs hardness, is a scale representing the hardness of substances in 10 steps, with diamond, which is the hardest, having a hardness of 10.

Component (B) has a Mohs hardness of 5 or less, and preferably from 2 to 5. Damage to silicon chips tends to arise at a Mohs hardness greater than 5. The thermally conductive silicone composition of the invention does not include thermally conductive inorganic filler having a Mohs hardness greater than 5.

When component (B) has an average particle size smaller than 0.1 μm, the viscosity of the thermally conductive silicone composition rises excessively, making the composition difficult to handle; when the average particle size exceeds 200 μm, the resulting thermally conductive silicone composition tends to be non-uniform. Hence, the average particle size must be from 0.1 to 200 μm, and is preferably from 0.5 to 100 μm, and more preferably from 0.5 to 50 μm. In the practice of this invention, the average particle size is the volume-based mean particle diameter and can be measured with the Microtrac MT-3300EX from Nikkiso Co., Ltd.

The type of thermally conductive inorganic filler used as component (B) may be anything that has a Mohs hardness of 5 or less, but is preferably at least one type selected from the group consisting of aluminum powder, zinc oxide powder, boron nitride powder and aluminum hydroxide powder. In terms of the loading ability, aluminum powder and zinc oxide powder are especially preferred. In addition, of the above, two or more fillers of differing types, average particle sizes and the like may be blended and used together.

The content of component (B) per 100 parts by weight of the organopolysiloxane of component (A) must be in the range of 100 to 3,000 parts by weight, and is preferably in the range of 500 to 2,000 parts by weight. At less than 100 parts by weight, not only is a sufficient thermal conductivity not obtainable, but the composition is also unable to retain strength as a grease and tends to creep. At more than 3,000 parts by weight, the composition becomes more difficult to handle.

[Component (C)]

The volatile solvent used as component (C) in the thermally conductive silicone composition of the invention serves to lower the viscosity of the thermally conductive silicone composition and make it easier to work with. Any solvent may be used, so long as it is one in which the organopolysiloxane used as component (A) and the thermally conductive inorganic filler used as component (B) can be dissolved or dispersed. Examples include toluene, xylene, acetone, methyl ethyl ketone, cyclohexane, n-hexane, n-heptane, butanol, isopropyl alcohol (IPA) and isoparaffin. In particular, from the standpoint of safety, health and printing workability, the use of isoparaffinic solvents having a boiling point between 80° C. and 360° C. is preferred. With a solvent having a boiling point below 80° C., evaporation is too rapid and the viscosity rises during the printing operation, which leads to problems. At a boiling point in excess of 360° C., some of the solvent tends to remain within the thermally conductive silicone composition, lowering the thermal properties of the composition.

Specific examples of isoparaffinic solvents having a boiling point between 80° C. and 360° C. include those available from Idemitsu Kosan Co., Ltd. under the isoparaffinic solvent trade names IP Solvent 2028MU and IP Solvent 2835.

The amount of component (C) added in this invention is from 0.1 to 100 parts by weight per 100 parts by weight of component (A). When the amount of component (C) added is less than 0.1 part by weight, the viscosity of the thermally conductive silicone composition cannot be sufficiently lowered. When the amount is higher than 100 parts by weight, precipitation of the thermally conductive inorganic filler becomes more rapid and the shelf stability of the thermally conductive silicone composition worsens. Hence, the amount is preferably in the range of 5 to 70 parts by weight, and more preferably in the range of 10 to 50 parts by weight.

With regard to the creep resistance of the thermally conductive silicone composition, creep is better suppressed when the organopolysiloxane used as component (A) is one having a higher viscosity. Also, when loadings of the thermally conductive inorganic filler are increased in order to raise the thermal conductivity performance, the viscosity of the thermally conductive silicone composition rises. That is, suppressing the creep resistance and enhancing the thermal conductivity performance both serve to raise the viscosity of the thermally conductive silicone composition. However, from the standpoint of the handleability and other considerations, there are limits to the allowable viscosity. Hence, in this invention, the viscosity of the thermally conductive silicone composition is adjusted by adding component (C). In this way, a thermally conductive silicone composition having a workability and a thermal interface performance that are both of a higher order than in the prior art can be developed for practical use.

For example, when the thermally conductive silicone composition of the invention has been thinly applied onto a heatsink or the like using a printing means such as a metal screen, the solvent contained therein can be easily evaporated at normal temperature or by actively heating. Hence, a high-performance thermally conductive silicone composition which previously would have been difficult to uniformly and thinly apply can now be readily put to practical use.

When producing the thermally conductive silicone composition of the invention, components (A) to (C) are added and mixed together using a mixer such as the Trimix, Twinmix or Planetary Mixer (all registered trademarks of mixers manufactured by Inoue Mfg., Inc.), the Ultra Mixer (registered trademark of mixers manufactured by Mizuho Industrial Co., Ltd.) or the HIVIS DISPER MIX (registered trademark of mixers manufactured by Tokushu Kika Kogyo KK). If necessary, heating at between 50° C. and 150° C. may be carried out. However, when heating is carried out, from the standpoint of safety, it is preferable to first mix together just components (A) and (B) under heating and, after cooling the mixture, to subsequently add component (C) and mix further.

When the viscosity of the thermally conductive silicone composition of the invention, as measured at 25° C. using a Malcom viscometer at a rotor speed of 10 rpm, is lower than 10 Pa·s, the thermally conductive inorganic filler tends to precipitate, resulting in a poor storage stability. When the viscosity is greater than 500 Pa·s, screen printing and the like becomes difficult and the handleability of the composition worsens. Hence, the viscosity is preferably in the range of 10 to 500 Pa·s, and more preferably in the range of 30 to 300 Pa·s.

The thermally conductive silicone composition of the invention is particularly well-suited for use as a thermal interface for heat-generating devices such as CPUs and GPUs in notebook computers, and in automotive electronic control unit (ECU) applications.

EXAMPLES

The invention is illustrated more concretely below by way of Examples and Comparative Examples, although the invention is not limited by these Examples. Tests relating to the Examples and Comparative Examples were carried out as follows in order to more clearly demonstrate the superiority of the invention.

[Thixotropic Index]

The thixotropic index α of an organopolysiloxane (component (A)) is defined as $\eta 1/\eta 2$. Here, $\eta 1$ is the viscosity measured at 25° C. with a Brookfield viscometer (model TVB-10 from Toki Sangyo Co., Ltd.) at a rotor speed of 2 rpm, and $\eta 2$ is the viscosity measured at 25° C. and a rotor speed of 4 rpm.

[Particle Size]

The particle size of the thermally conductive inorganic filler (component (B)) was the volume-based cumulative mean diameter, as measured with the Microtrac MT-3300EX from Nikkiso Co., Ltd.

[Thermal Conductivity]

The thermal conductivity of the thermally conductive silicone composition was measured at 25° C. using the TPS-2500 from Kyoto Electronics Manufacturing Co., Ltd.

[Grease Viscosity]

The viscosity of the thermally conductive silicone composition was measured using a model PC-1TL viscometer (rotor speed, 10 rpm) manufactured by Malcom Co., Ltd.

[Creep]

The creep of the thermally conductive silicone composition was rated based on the numerical value measured according to the following steps.

(1) A test specimen was fabricated by first applying 0.5 cc of the thermally conductive silicone composition onto an aluminum plate and loading the plate into an 80° C. chamber for 30 minutes, causing the solvent to evaporate. The plate was then removed from the chamber and cooled, following which a 1.5 mm spacer was provided thereon and a slide glass was placed on top, sandwiching the composition between the plate and the slide glass, and this arrangement was secured with clips (the thermally conductive silicone composition being sandwiched so as to become circular with a diameter of about 2 cm).

(2) The test specimen was then set perpendicular to the ground and placed in a thermal shock tester from Espec Corporation (model: TSE-11-A), where a heat cycling test in which the temperature fluctuates repeatedly between −40° C. and 150° C. (for 30 minutes each) was carried out for 1,000 cycles.

(3) After a 1,000 cycle test, the distance that the thermally conductive silicone composition had moved from the original position was measured. When the distance was 3 mm or less, the creep was rated as "○"; when it was more than 3 mm, the creep was rated as "x."

[Silicon Chip Scratch Test]

The thermally conductive silicone composition was placed between two 10 mm square silicon wafers, and the silicon wafers were rubbed together up and down by hand a total of 100 times at a rate of about once per second. The silicon wafers were then washed with toluene and their surfaces were examined under an optical microscope. When no scratches were observed, the result was rated as "○"; when scratches were observed, the result was rated as "x."

[Printability Test]

A 2 cm×2 cm square hole was made in a 0.3 mm thick stainless steel plate, and an aluminum plate was placed underneath the steel plate. The thermally conductive silicone composition was placed on the steel plate near the square hole and the composition was printed onto the aluminum plate with a squeegee. The steel plate was then removed and the state of the thermally conductive silicone composition that had been printed onto the aluminum plate was examined. This test was used to check the workability of the composition. The printability was rated as "○" when the printed surface was clean and neat throughout, and was rated as "x" when there were unprinted spots such as skips on the printed surface.

Synthesis Example 1: Synthesis of Component (A) Organopolysiloxane A-1

A 2,000 mL flask equipped with a stirrer, a thermometer, a condenser and a nitrogen gas inlet was charged with 250 g of an organopolysiloxane which is capped at both ends with dimethylvinylsilyl groups, has a backbone that is 100% methyl groups and has a viscosity at 25° C. as measured using an Ostwald viscometer of 600 mm²/s, 4.5 g of an organohydrogenpolysiloxane of formula (3) below (ratio of total SiH groups in the organohydrogenpolysiloxane to total vinyl groups in the organopolysiloxane (SiH/SiVi)=0.60), and 950 g of a hydrolyzable organopolysiloxane of formula (4) below. To this was also added 0.25 g of a dimethylvinylsilyl end-capped dimethylpolysiloxane solution of a platinum-divinyltetramethyldisiloxane complex (platinum catalyst containing 1 wt % of platinum atoms), following which the flask contents were mixed and stirred for 1 hour at 150° C., giving Organopolysiloxane A-1.

[Chem. 5]

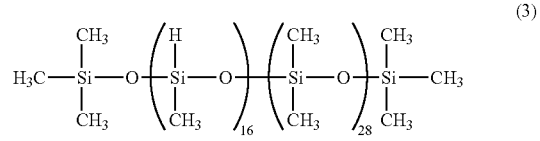

(3)

[Chem. 6]

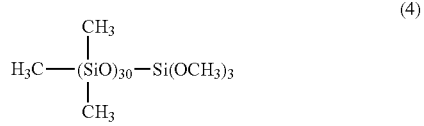

(4)

The amount of hydrolyzable organopolysiloxane contained in the resulting Organopolysiloxane A-1 corresponded to 79.2 wt %. The viscosities of the organopolysiloxane A-1 at 25° C. were as follows, and the thixotropic index α was calculated to be 1.90.

Viscosity Measurement Results:
 Rotor H5/2 rpm: 74,000 mPa·s
 Rotor H5/4 rpm: 39,000 mPa·s

Synthesis Example 2: Synthesis of Component (A) Organopolysiloxane A-2

Aside from changing the amount of organohydrogenpolysiloxane of formula (3) used in Synthesis Example 1 to 4.0 g (SiH/SiVi=0.53) and changing the amount of hydrolyzable organopolysiloxane of formula (4) to 400 g, Organopolysiloxane A-2 was obtained in exactly the same way as in Synthesis Example 1. The amount of hydrolyzable organopolysiloxane contained in the resulting Organopolysiloxane A-2 corresponded to 61.3 wt %. The viscosities of the organopolysiloxane A-2 at 25° C. were as follows, and the thixotropic index α was calculated to be 1.72.
Viscosity Measurement Results:
 Rotor H5/2 rpm: 36,100 mPa·s
 Rotor H5/4 rpm: 21,000 mPa·s

Synthesis Example 3: Synthesis of Component (A) Organopolysiloxane A-3

A 2,000 mL flask equipped with a stirrer, a thermometer, a condenser and a nitrogen gas inlet was charged with 200 g of an organopolysiloxane which is capped at both ends with dimethylvinylsilyl groups, has a backbone that is 100% methyl groups and has a viscosity at 25° C. as measured using an Ostwald viscometer of 600 mm²/s, 50 g of an organopolysiloxane which is similarly capped at both ends with dimethylvinylsilyl groups, has a backbone that is 100% methyl groups and has a viscosity at 25° C. as measured using an Ostwald viscometer of 30,000 mm²/s, 1.5 g of an organohydrogenpolysiloxane of formula (3) above, 8.7 g of an organohydrogenpolysiloxane of formula (5) below (SiH/SiVi=0.74), and 300 g of the hydrolyzable organopolysiloxane of formula (4) above. To this was also added 0.25 g of a dimethylvinylsilyl end-capped dimethylpolysiloxane solution of a platinum-divinyltetramethyldisiloxane complex (platinum catalyst containing 1 wt % of platinum atoms), following which the flask contents were mixed and stirred for 1 hour at 150° C., giving Organopolysiloxane A-3.

[Chem. 7]

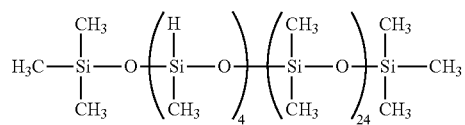

(5)

The amount of hydrolyzable organopolysiloxane contained in the resulting Organopolysiloxane A-3 corresponded to 53.6 wt %. The viscosities of the organopolysiloxane A-3 at 25° C. were as follows, and the thixotropic index α was calculated to be 1.61.
Viscosity Measurement Results:
 Rotor H5/2 rpm: 17,700 mPa·s
 Rotor H5/4 rpm: 11,000 mPa·s

Synthesis Example 4: Synthesis of Component (A) Organopolysiloxane A-4

Comparative Example

Aside from changing the amount of organohydrogenpolysiloxane of formula (3) used in Synthesis Example 1 to 3.5 g (SiH/SiVi=0.47), Organopolysiloxane A-4 was obtained in exactly the same way as in Synthesis Example 1. The amount of hydrolyzable organopolysiloxane contained in the resulting Organopolysiloxane A-4 corresponded to 78.9 wt %. The viscosities of the organopolysiloxane A-4 at 25° C. were as follows, and the thixotropic index α was calculated to be 1.10.
Viscosity Measurement Results:
 Rotor H2/2 rpm: 1,650 mPa·s
 Rotor H2/4 rpm: 1,500 mPa·s

Synthesis Example 5: Synthesis of Component (A) Organopolysiloxane A-5

Comparative Example

Aside from changing the amount of organohydrogenpolysiloxane of formula (3) used in Synthesis Example 3 to 0.5 g (SiH/SiVi=0.62), Organopolysiloxane A-5 was obtained in exactly the same way as in Synthesis Example 3. The amount of hydrolyzable organopolysiloxane contained in the resulting Organopolysiloxane A-5 corresponded to 53.6 wt %. The viscosities of the organopolysiloxane A-5 at 25° C. were as follows, and the thixotropic index α was calculated to be 1.29.
Viscosity Measurement Results:
 Rotor H2/2 rpm: 4,500 mPa·s
 Rotor H2/4 rpm: 3,500 mPa·s Component (B):
 B-1: Aluminum powder (average particle size, 10.3 µm); Mohs hardness: 2.9
 B-2: Aluminum powder (average particle size, 1.5 µm); Mohs hardness: 2.9
 B-3: Aluminum hydroxide powder (average particle size, 0.9 µm); Mohs hardness: 3
 B4: Zinc oxide powder (average particle size, 1.1 µm); Mohs hardness: 4 to 5
 B-5: Boron nitride powder (average particle size, 8.0 µm); Mohs hardness: 2.0
 B-6 and B-7 are for the Comparative Examples
 B-6: Alumina powder (average particle size, 10.0 µm); Mohs hardness: 8 to 9
 B-7: Aluminum nitride powder (average particle size, 7.0 µm); Mohs hardness: 8

Component (C)
 C-1: IP Solvent 2028MU
  (an isoparaffinic solvent available under this trade name from Idemitsu Kosan Co., Ltd.) melting point, 210-254° C.
 C-1: IP Solvent 2835
  (an isoparaffinic solvent available under this trade name from Idemitsu Kosan Co., Ltd.) melting point, 270-350° C.

[Production of Thermally Conductive Silicone Compositions]

The ingredient formulations shown in Tables 1 and 2 were blended together and mixed for one hour at 150° C. using a Planetary Mixer (Inoue Mfg., Inc.), thereby giving the thermally conductive silicone compositions of Examples 1 to 7 and Comparative Examples 1 to 6.

The results in Tables 1 and 2 demonstrate that the thermally conductive silicone compositions of the invention do not damage silicon chips and moreover have an excellent creep resistance.

TABLE 1

| Ingredients | | | Example 1 | 2 | 3 | 4 | 5 | 6 | 7 |
|---|---|---|---|---|---|---|---|---|---|
| Formulation (g) | Component (A) | A-1 | 100 | | | 100 | 100 | 100 | 100 |
| | | A-2 | | 100 | | | | | |
| | | A-3 | | | 100 | | | | |
| | Component (B) | B-1 | 700 | 700 | 700 | 700 | 350 | 1120 | 560 |
| | | B-2 | 300 | 300 | 300 | 300 | 300 | 480 | 240 |
| | | B-3 | | | | 250 | | | |
| | | B-4 | 250 | 250 | 250 | | 250 | 400 | 200 |
| | | B-5 | | | | | 350 | | |
| | Component (C) | C-1 | 27 | 27 | 27 | | 35 | | |
| | | C-2 | | | | 27 | | 50 | 20 |
| Thermal conductivity (W/m · K) | | | 3.9 | 3.8 | 3.9 | 3.8 | 3.4 | 4.2 | 3.6 |
| Grease viscosity (Pa · s) | | | 150 | 110 | 80 | 140 | 120 | 140 | 200 |
| Creep resistance (mm) | | | 0 | 0 | 0 | 0 | 1 | 1 | 0 |
| Creep resistance rating | | | ○ | ○ | ○ | ○ | ○ | ○ | ○ |
| Silicon chip scratch test | | | ○ | ○ | ○ | ○ | ○ | ○ | ○ |
| Printability test | | | ○ | ○ | ○ | ○ | ○ | ○ | ○ |

TABLE 2

| Ingredients | | | Comparative Example 1 | 2 | 3 | 4 | 5 | 6 |
|---|---|---|---|---|---|---|---|---|
| Formulation (g) | Component (A) | A-1 | 100 | 100 | | | 100 | 100 |
| | | A-2 | | | | | | |
| | | A-3 | | | | | | |
| | | A-4 | | | 100 | | | |
| | | A-5 | | | | 100 | | |
| | Component (B) | B-1 | | | 700 | 700 | 700 | 700 |
| | | B-2 | 300 | 300 | 300 | 300 | 300 | 300 |
| | | B-3 | | | | | | |
| | | B-4 | 250 | 250 | 250 | 250 | 250 | 250 |
| | | B-5 | | | | | | |
| | | B-6 | 700 | | | | | |
| | | B-7 | | 700 | | | | |
| | Component (C) | C-1 | 27 | 27 | 27 | 27 | | 120 |
| | | C-2 | | | | | | |
| Thermal conductivity (W/m · K) | | | 3.8 | 3.9 | 3.9 | 3.9 | 6.0 | — |
| Grease viscosity (Pa · s) | | | 130 | 160 | 120 | 130 | 800 | separated/could not be measured |
| Creep resistance (mm) | | | 0 | 0 | 15 | 10 | 0 | — |
| Creep resistance rating | | | ○ | ○ | x | x | ○ | — |
| Silicon chip scratch test | | | x | x | ○ | ○ | ○ | — |
| Printability test | | | ○ | ○ | ○ | ○ | x | — |

The invention claimed is:

1. A thermally conductive silicone composition comprising:
    (A) 100 parts by weight of an organopolysiloxane having a thixotropic index α of from 1.51 to 2.00, wherein the thixotropic index α is the value calculated from the formula α=η1/η2, where η1 is the viscosity measured at 25° C. using a Brookfield rotational viscometer at a rotor speed of 2 rpm and η2 is the viscosity similarly measured at a rotor speed of 4 rpm, and a viscosity, as measured at 25° C. using a Brookfield rotational viscometer at a rotor speed of 2 rpm, of from 10 to 1,000,000 mPa,
    (B) from 100 to 3,000 parts by weight of a thermally conductive inorganic filler having a Mohs hardness of 5 or less and an average particle size of from 0.1 to 200 μm, and
    (C) from 0.1 to 100 parts by weight of a volatile solvent in which components (A) and (B) can be dispersed or dissolved,
    wherein the composition is free of thermally conductive inorganic filler having a Mohs hardness greater than 5,
    the organopolysiloxane of component (A) comprises
    (a1) from 1 to 95 wt % of a hydrolyzable organopolysiloxane of general formula (1) below that is trifunctional at one end

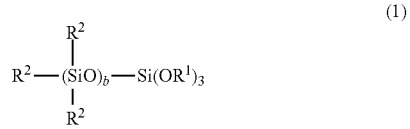

wherein each $R^1$ is independently an alkyl group of 1 to 6 carbon atoms, each $R^2$ is independently a saturated or unsaturated monovalent hydrocarbon group of 1 to 20 carbon atoms, and b is an integer from 5 to 120, and
    (a2) an addition reaction product obtained by addition-reacting an organopolysiloxane having at least one alkenyl group per molecule with an organohydrogenpolysiloxane, wherein the organohydrogenpolysiloxane has a general formula (2) below

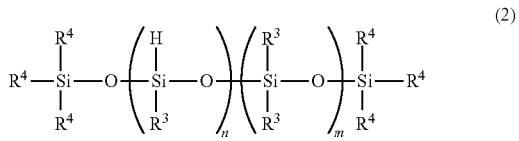
(2)

wherein each $R^3$ is independently a saturated or unsaturated monovalent hydrocarbon group of 1 to 20 carbon atoms, each $R^4$ is independently a hydrogen atom or $R^3$, n is an integer from 1 to 1,000, and m is an integer from 0 to 1,000, and the viscosity at 25° C. of the thermally conductive silicone composition is 10 to 500 Pa·s.

2. The thermally conductive silicone composition of claim 1, wherein the thermally conductive inorganic filler of component (B) is at least one selected from the group consisting of aluminum powder, zinc oxide powder, boron nitride powder and aluminum hydroxide powder.

3. The thermally conductive silicone composition of claim 1, wherein the solvent of component (C) is an isoparaffinic solvent having a boiling point between 80° C. and 360° C.

4. The thermally conductive silicone composition of claim 1, wherein the organopolysiloxane of component (A) consists of:

(a1) a hydrolyzable organopolysiloxane of general formula (1) below that is trifunctional at one end

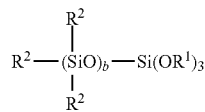
(1)

wherein each $R^1$ is independently an alkyl group of 1 to 6 carbon atoms, each $R^2$ is independently a saturated or unsaturated monovalent hydrocarbon group of 1 to 20 carbon atoms, and b is an integer from 5 to 120, and (a2) an addition reaction product obtained by addition-reacting an organopolysiloxane having at least one alkenyl group per molecule with an organohydrogenpolysiloxane, wherein the organohydrogenpolysiloxane has a general formula (2) below

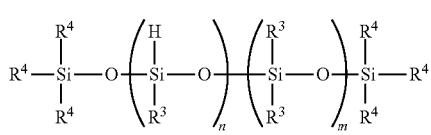
(2)

wherein each $R^3$ is independently a saturated or unsaturated monovalent hydrocarbon group of 1 to 20 carbon atoms, each $R^4$ is independently a hydrogen atom or $R^3$, n is an integer from 1 to 1,000, and m is an integer from 0 to 1,000.

5. The thermally conductive silicone composition of claim 1, wherein the organopolysiloxane of component (A) further comprises (a3) a dimethylpolysiloxane without reactive groups.

6. The thermally conductive silicone composition of claim 1, wherein the content of the (a1) is 20 to 90 wt % based on the component (A).

7. The thermally conductive silicone composition of claim 1, wherein the content of the (a1) is 30 to 80 wt % based on the component (A).

8. The thermally conductive silicone composition of claim 1, wherein the viscosity at 25° C. of the thermally conductive silicone composition is 30 to 300 Pa·s.

* * * * *